United States Patent [19]
Monett et al.

[11] Patent Number: 5,438,792
[45] Date of Patent: Aug. 8, 1995

[54] INSECT TRAPS

[75] Inventors: Edward Monett, Westfield, N.J.; Robert Blackman, 1023 Irving Ave., Westfield, N.J. 07090

[73] Assignee: Robert Blackman, Westfield, N.J.

[21] Appl. No.: 186,295

[22] Filed: Jan. 25, 1994

[51] Int. Cl.6 .............................................. A01M 1/14
[52] U.S. Cl. ....................................... 43/114; 43/121
[58] Field of Search ................. 43/107, 114, 115, 121, 43/131, 132.1

[56] References Cited

U.S. PATENT DOCUMENTS

| | | | |
|---|---|---|---|
| 827,006 | 7/1906 | Gathmann et al. | 43/115 |
| 1,820,186 | 8/1931 | Gaskins | 43/131 |
| 2,291,358 | 7/1942 | Treadwell . | |
| 3,023,539 | 3/1962 | Emerson | 43/114 |
| 3,304,646 | 2/1967 | Staley . | |
| 4,122,246 | 10/1978 | Sierawaski . | |
| 4,581,845 | 4/1986 | Burkholder et al. . | |
| 4,785,066 | 11/1988 | Maxson . | |
| 4,819,371 | 4/1989 | Cohen . | |
| 4,866,877 | 9/1989 | Barak et al. . | |
| 4,954,597 | 9/1990 | Revis . | |
| 4,959,924 | 10/1990 | Martin | 43/132.1 |
| 5,004,792 | 4/1991 | Maxson . | |
| 5,042,194 | 8/1991 | Cohen . | |
| 5,153,332 | 10/1992 | Enami et al. . | |
| 5,239,085 | 4/1993 | Enami et al. . | |

Primary Examiner—P. Austin Bradley
Assistant Examiner—James Miner

[57] ABSTRACT

According to the present invention, an insect trap is provided which comprises: (1) a generally rectangular shaped enclosure provided with a plurality of openings therethrough, and (2) a plurality of inner partition walls positioned within the enclosure to provide a plurality of generally triangular passageways within the enclosure, the inner partition walls comprising a folded composite planar sheet having an upper and lower sheet member housing an adhesive sheet, the upper and lower sheet members having a plurality of openings therein to permit an insect passing thereon to contact an adhesive surface of the adhesive sheet and the adhesive sheet member and the upper and lower sheet members having a plurality of connecting apertures therethrough to permit insects to pass through the composite planar sheet.

20 Claims, 6 Drawing Sheets

INSECT TRAPS

FIELD OF THE INVENTION

This invention relates generally to devices for trapping pests, and more particularly to devices for trapping insects.

BACKGROUND OF THE INVENTION

U.S. Pat. No. 2,291,358 to Treadwell is directed to an insect bait holder adapted to contain adhesively applied to the inner face of the container bottom, a substance which can contain a bait to attract the insect and a poisonous ingredient. The device is not adapted to restrain the insect, but rather allows the insect to take the bait and leave through any one of a number of openings in the outer container, which is generally rectangular in shape.

U.S. Pat. No. 3,304,646 to Staley is directed to traps for bugs and the like which in one embodiment provides holes or the like by means of a corrugated sheet to provide channels which may be cylindrical, triangular, wave form, corrugated or polygonal in cross-section. The device is formed from a cheap construction of paper, plastic, composition, metal, etc., and the inside surfaces away from the end or entrances to the chambers are coated with a sticky glue like fly paper or birdlime, which can be poisoned and provided with a food smell to attract the particular insects desired.

U.S. Pat. No. 4,581,845 to Burkholder et al. is directed to a suffocation type insect trap with an attractant for the insect and a pitfall chamber that contains a pool to suffocate insects which fall into the chamber. The trap is constructed from single-faced corrugated paperboard.

U.S. Pat. No. 4,819,371 to Cohen is directed to an insect trap that comprises a generally rectangular shaped enclosure with interior dual triangular shaped chambers which are coated with a contact poison for the insect. The trap is formed by folding a paperboard blank having an outer moisture barrier.

U.S. Pat. No. 4,866,877 to Barak et al. is directed to a vertical wall mount insect trap having an oil containing pitfall chamber and insect attractant. This trap is also constructed from single faced corrugated paperboard.

U.S. Pat. Nos. 4,518,845 and 4,866,877 teach that sticky traps have met with limited success in that they do not rapidly kill the insects and the level of adhesive required to prevent escapes tends to have a repelling effect.

U.S. Pat. No. 5,042,194 to Cohen is directed to an insect trap which comprises inner walls, within a rectangular shaped enclosed, which define triangular-shaped hollow spaces. The insect trap is formed by folding a paperboard blank having an outer moisture inhibiting coating and treated with an insecticide.

The above prior art insects traps can be therefore divided into three main classes: insects traps adapted to restrain an insect by mean of an adhesive; insect traps adapted to suffocate an insect by means of a body of liquid oil; and insect traps.

SUMMARY OF THE INVENTION

According to the present invention, an insect trap is provided which comprises: (1) a generally rectangular shaped enclosure provided with a plurality of openings therethrough, and (2) a plurality of inner partition walls positioned within the enclosure to provide a plurality of generally triangular passageways within the enclosure, the inner partition walls comprising a folded composite planar sheet having an upper and lower sheet member housing an adhesive sheet, the upper and lower sheet members having a plurality of openings therein to permit an insect passing thereon to contact an adhesive surface of the adhesive sheet and the adhesive sheet member and the upper and lower sheet members having a plurality of connecting apertures therethrough to permit insects to pass through the composite planar sheet.

DESCRIPTION OF THE PREFERRED EMBODIMENTS

Reference is now made to the accompanying figures wherein the same numbers refer to the same or similar elements.

According to the present invention, an insect trap is provided which comprises: (1) a generally rectangular shaped enclosure 40 provided with a plurality of openings 94 therethrough, and (2) a plurality of inner partition walls positioned within the enclosure to provide a plurality of generally triangular passageways 13 within the enclosure, the inner partition walls comprising a folded composite planar sheet 30 having an upper sheet member 12 and lower sheet member 12' housing an adhesive sheet 20, the upper and lower sheet members having a plurality of openings 14 therein to permit an insect passing thereon to contact an adhesive surface of the adhesive sheet 20, and the adhesive sheet member 20, the upper sheet member 12 and lower sheet member 12' having a plurality of connecting apertures 16 therethrough to permit insects to pass through the composite planar sheet 30.

Figure 1:
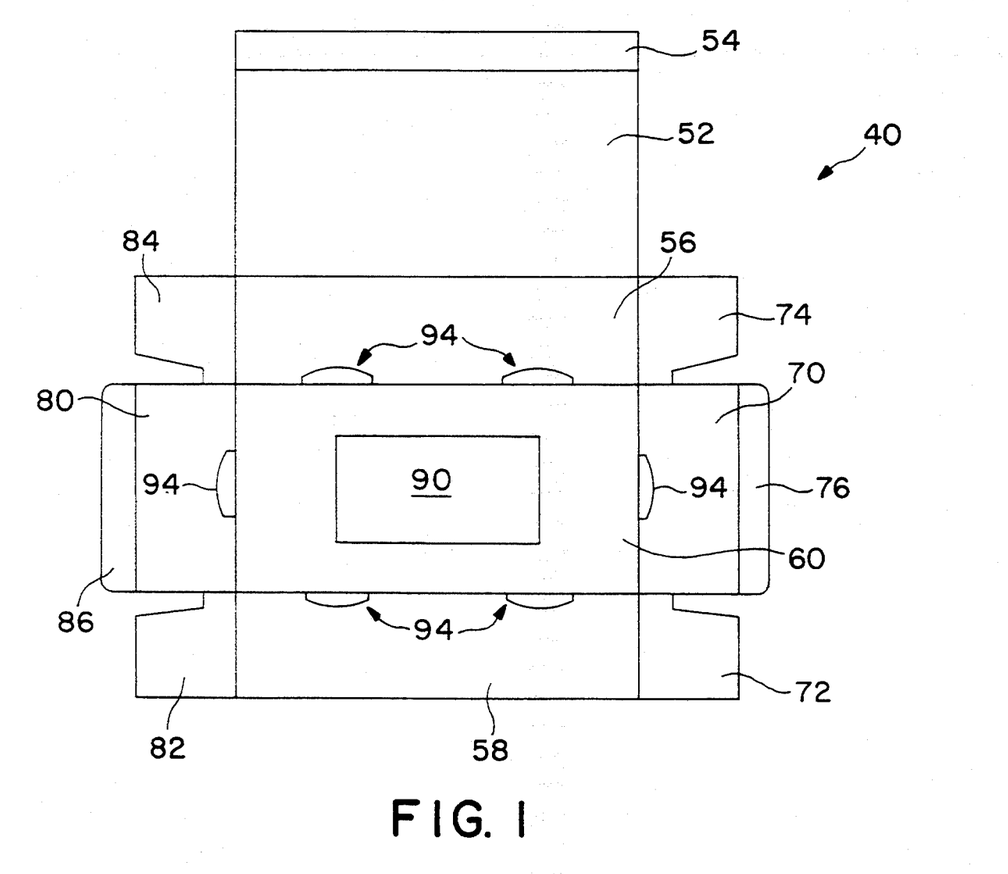
FIG. 1 is a bottom view of an unfolded rectangular shaped enclosure member.

As shown in FIG. 1, enclosure 40 may be formed by folding a blank form having a bottom 60, top 52, side walls 56 and 58, and end walls 70 and 80. Also provided are tabs 54, 74, 76, 72, 82, 84 and 86 to one or more of which a conventional adhesive can be applied to securely close the enclosure 40.

One or more apertures 94 are provided in one or more of the outer walls 56, 58, 70 and 80 of enclosure 40 to permit insects to pass from the exterior of the enclosure to the interior passageways, as will be more fully described below. Preferably from 1 to 6, and more preferably from 2 to 4, apertures 94 are provided in each outer wall, with at least one aperture 94 being preferably provided in the outer walls which are transverse to the triangular passageways 13 disposed within the device of this invention.

Preferably, at least one window aperture 90 is provided in bottom 60 of enclosure 40 to permit viewing of the extent to which insects are trapped within enclosure 40. Aperture 90 is preferably covered with a clear plastic sheet (not shown). In use, window aperture 90 and bottom 60 of the device of this invention rests on the floor or other surface.

Figure 2:
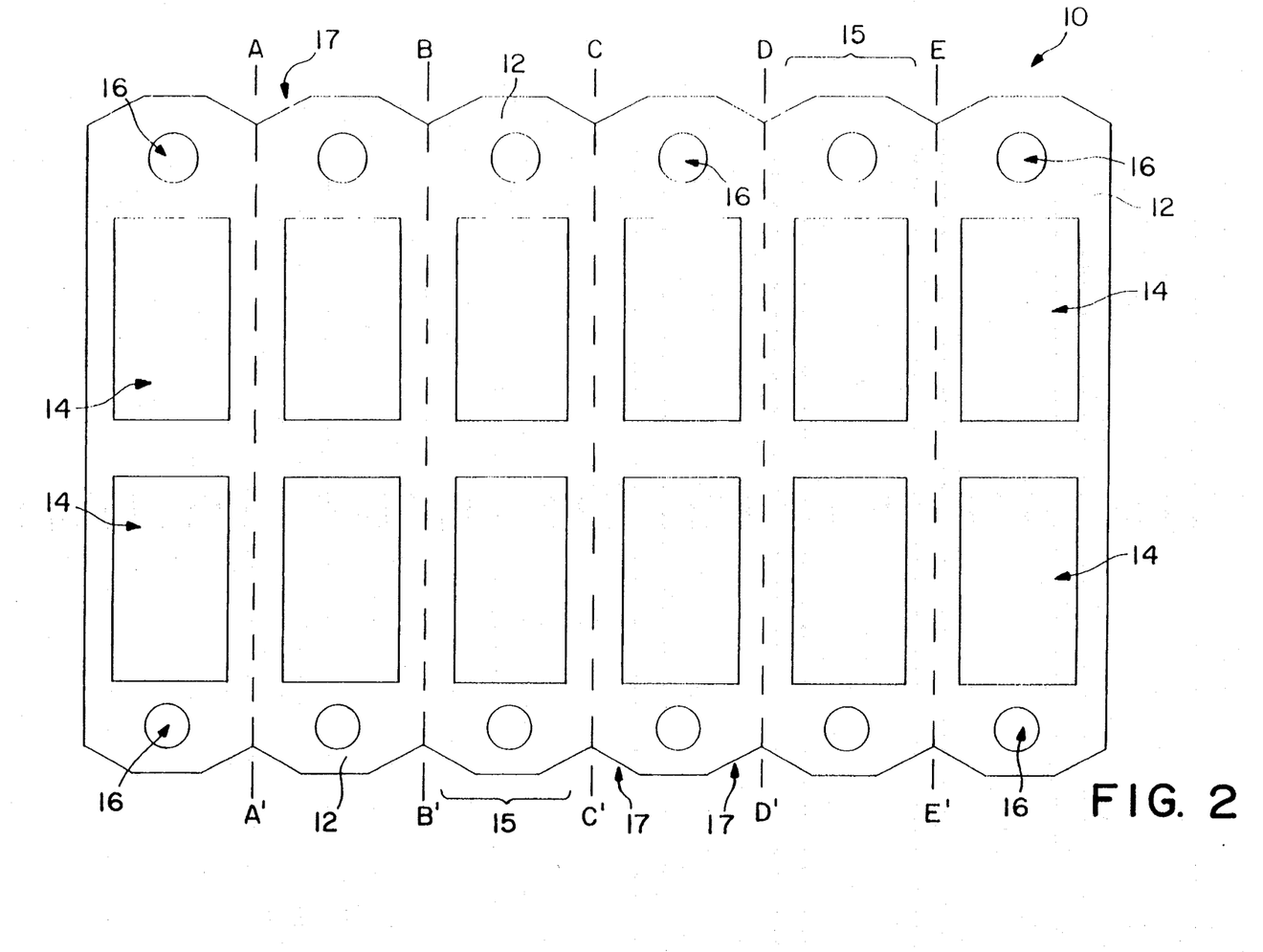
FIG. 2 is a top view of an upper sheet member.

In FIG. 2 there is illustrated a top view of an upper sheet member 12 of one embodiment of a composite planar sheet 30 which is provided with a plurality of sections 15, each having apertures 14 and openings 16, and (as is preferred) opposed angular edge portions 17. The composite planar sheet 30 is adapted to be folded along fold lines A—A', B—B', C—C', D—D' and E—E', alternately upwardly and downwardly, to provide a folded composite planar sheet 30 having a series of generally V-shaped cross-section portions. Opposed angular edge portions 17 are adapted, when sections 15 are folded, to provide a "notched" passageways through folded sheet 30. Lower sheet member 12' is similarly constructed as sheet member 12.

Figure 3:
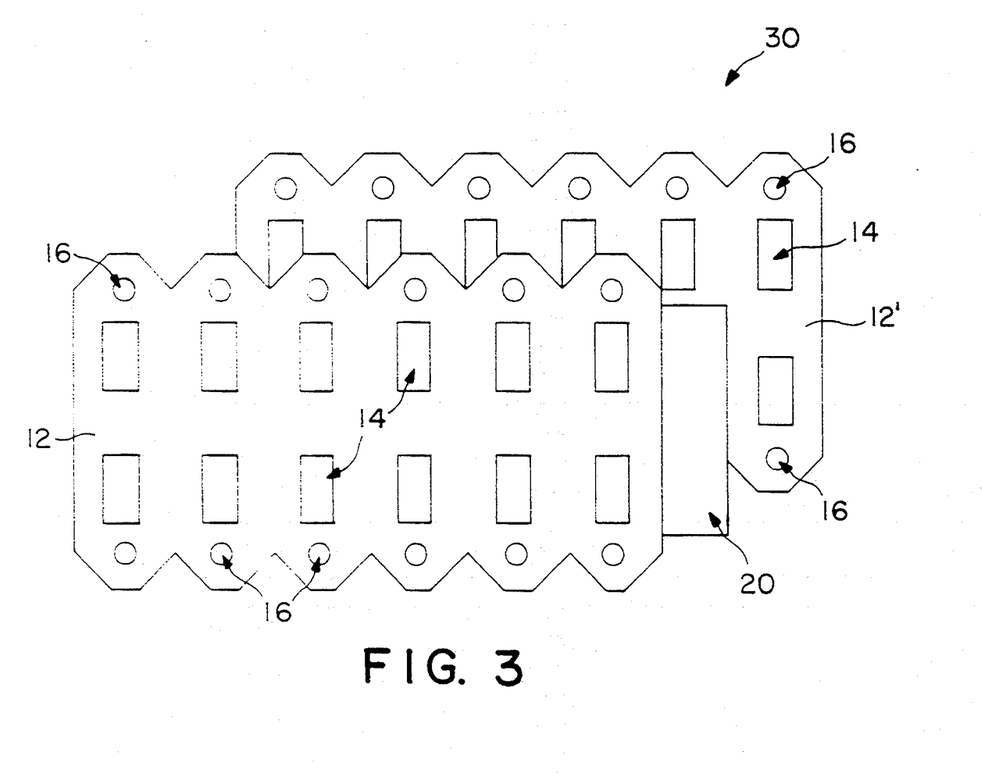
FIG. 3 is an exploded view of a composite planar sheet formed with upper sheet member 12 and lower sheet member 12', with adhesive sheet member 20 positioned therebetween.

Referring to FIG. 3, an exploded view of one embodiment of composite planar sheet 30 is illustrated having upper sheet member 12, lower sheet member 12', and adhesive sheet member 20 adapted for being folded into six sections. The upper sheet member 12, and lower sheet member 12' are provided with openings 16 to communicate the upper and lower surfaces of composite planar sheet 30 to permit an insect to pass through sheet 30.

When folded, composite planar sheet 30 is adapted to be housed within enclosure 40, as will be more fully discussed below.

Figure 4A:
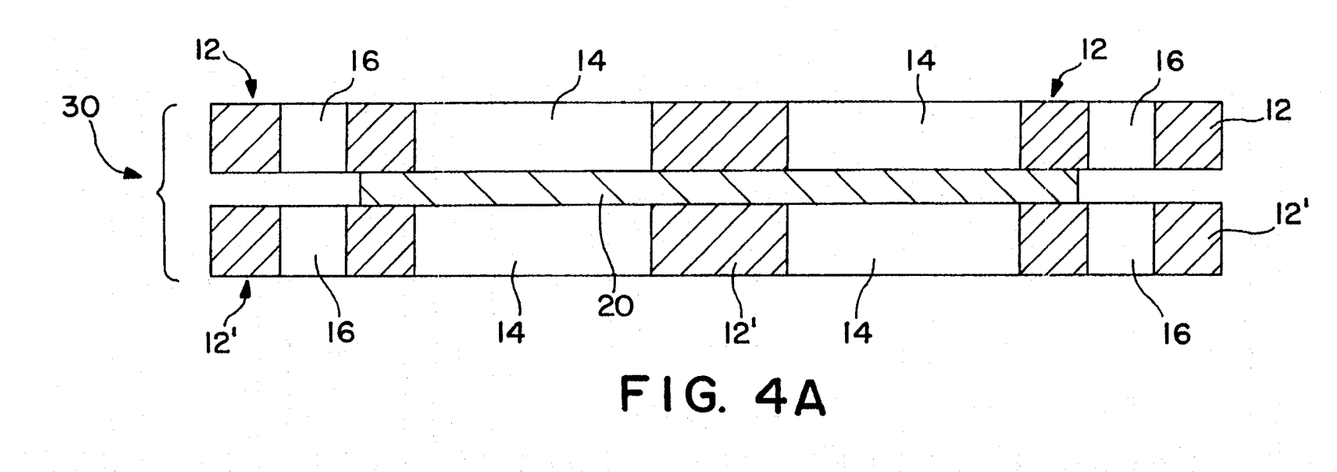
FIG. 4A is a side cross-sectional view of composite planar sheet formed with upper sheet member 12 and lower sheet member 12', with adhesive sheet member 20 positioned therebetween.

In FIG. 4A, composite planar sheet 30 is shown in a side cross-sectional view. Adhesive sheet member 20 is positioned between upper sheet member 12 and lower sheet member 12', with openings 16 cooperating to permit insects to pass through composite planar sheet 30. A plurality of apertures 14 are provided in both upper sheet member 12 and lower sheet member 12' to permit an insect to contact the exposed adhesive surfaces of adhesive sheet member 20.

Figure 4B:
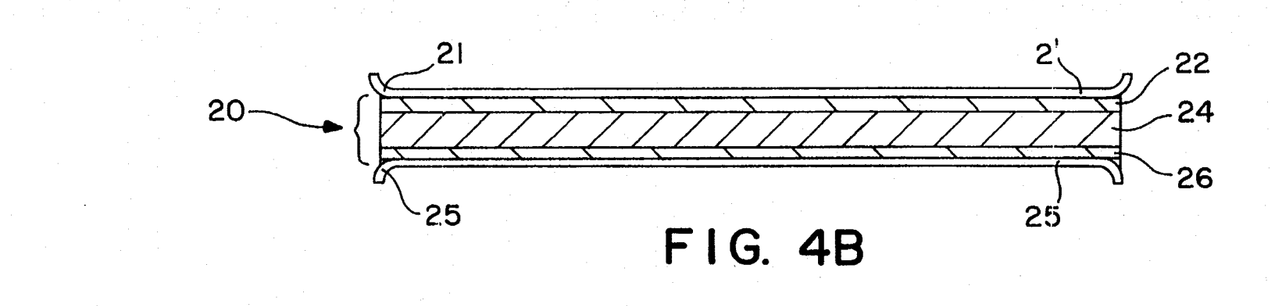
FIG. 4B is a side cross-sectional view of adhesive sheet member 20.

Adhesive sheet member 20, as shown in FIG. 4B, is composed of a film base 24 and upper and lower adhesive surfaces 22 and 26, respectively. Adhesive sheet 20 can be provided with added openings therethrough at one or more, but preferably not all, of apertures 14 in upper sheet member 12 and lower sheet member 12' to provide added openings in composite 30 through which insects can pass. An adhesive material can be applied to one or both of the upper and lower surfaces of adhesive sheet member 20, and the adhesive material can be applied to (and cured on) one or more portions or (as is preferred) to substantially all of the planar surfaces of adhesive sheet member 20 Adhesive sheet member 20 is manufactured to provide upper and lower adhesive surfaces 22 and 26 by applying adhesive (e.g., by means of a conventional roller, spraying means or other means), sequentially or simultaneously, to the upper and lower surfaces of a film material 24 (e.g., a plastic sheet such as polyester film (which is preferred), polyolefin film, polyvinyl chloride film, poly(vinyl acetate) film, polycarbonate film, and the like), and thereafter applying removable protective sheets 21 and 25, respectively, to the adhesive surfaces for ease of handling of the sheet 20. These protective sheets 21 and 25 can then be removed (e.g, by manually stripping them away) during manufacture of the composite planar sheet 30 to expose the adhesive surfaces.

Figure 5:
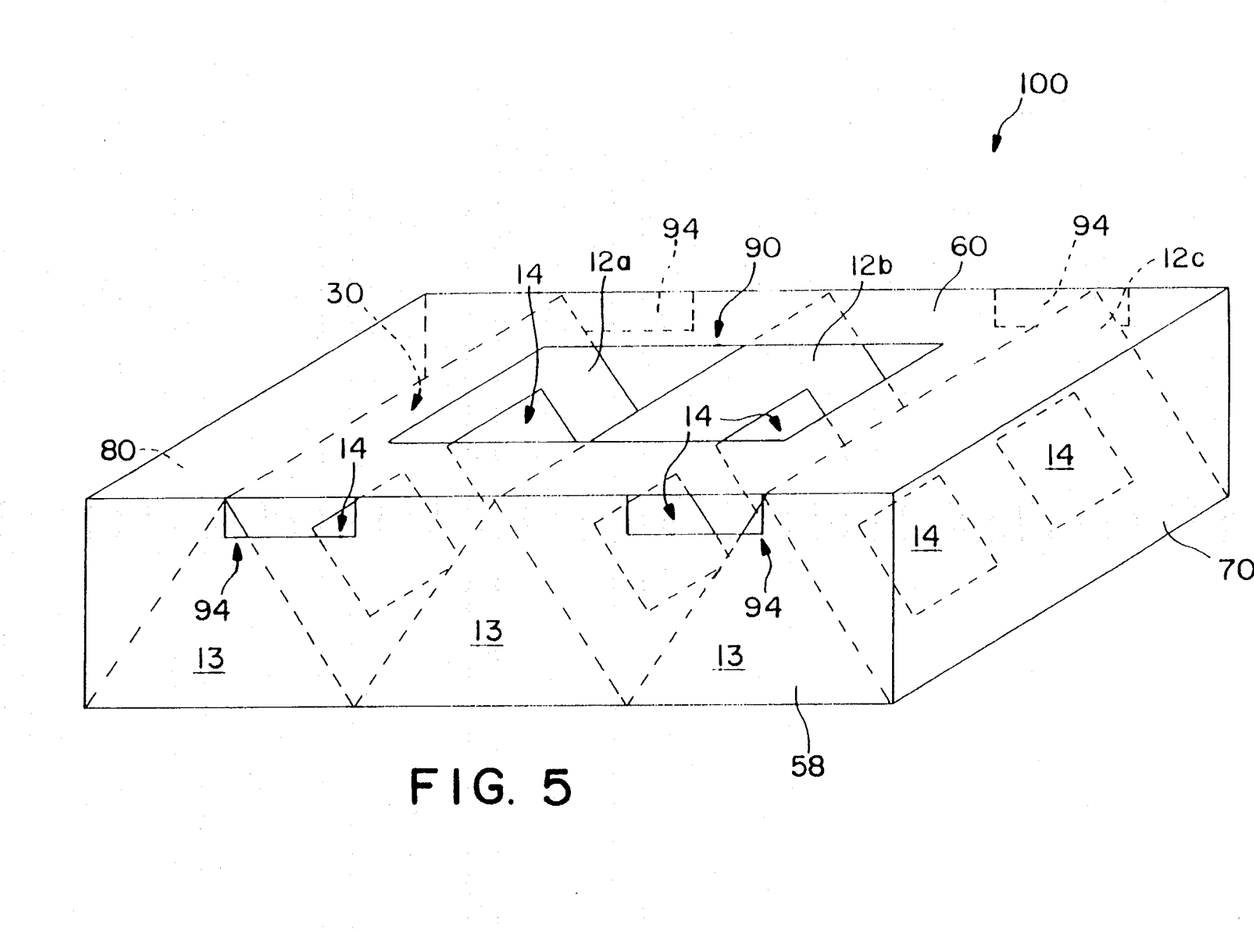
FIG. 5 is an inverted perspective view of one embodiment of the device of the present invention wherein triangular passageways are provided along an axis which is perpendicular to the longitudinal axis of the rectangular housing.

Referring now to FIG. 5, an inverted perspective view of device 100 (one embodiment of the device of the present invention) is provided wherein triangular passageways 13 are provided along an axis which is perpendicular to the longitudinal axis of the rectangular enclosure 40. Bottom 60 is provided with a clear plastic covered opening 90. Enclosure 40 is provided with two elongated apertures 94 in front wall 58 and in the opposed back wall to permit insects to pass from the exterior of enclosure 40 to a plurality of triangular passageways 13 within device 100. Within enclosure 40 is positioned a folded composite planar sheet 30 which includes a plurality of apertures 14 in the upper sheet member 12 and in lower sheet member 12' (not shown) in each section of the folded composite planar sheet 30. Folded composite sheet 30 also forms a plurality of "notched" passageways for insects by means of the opposed angular edge portions 17.

Figure 6:
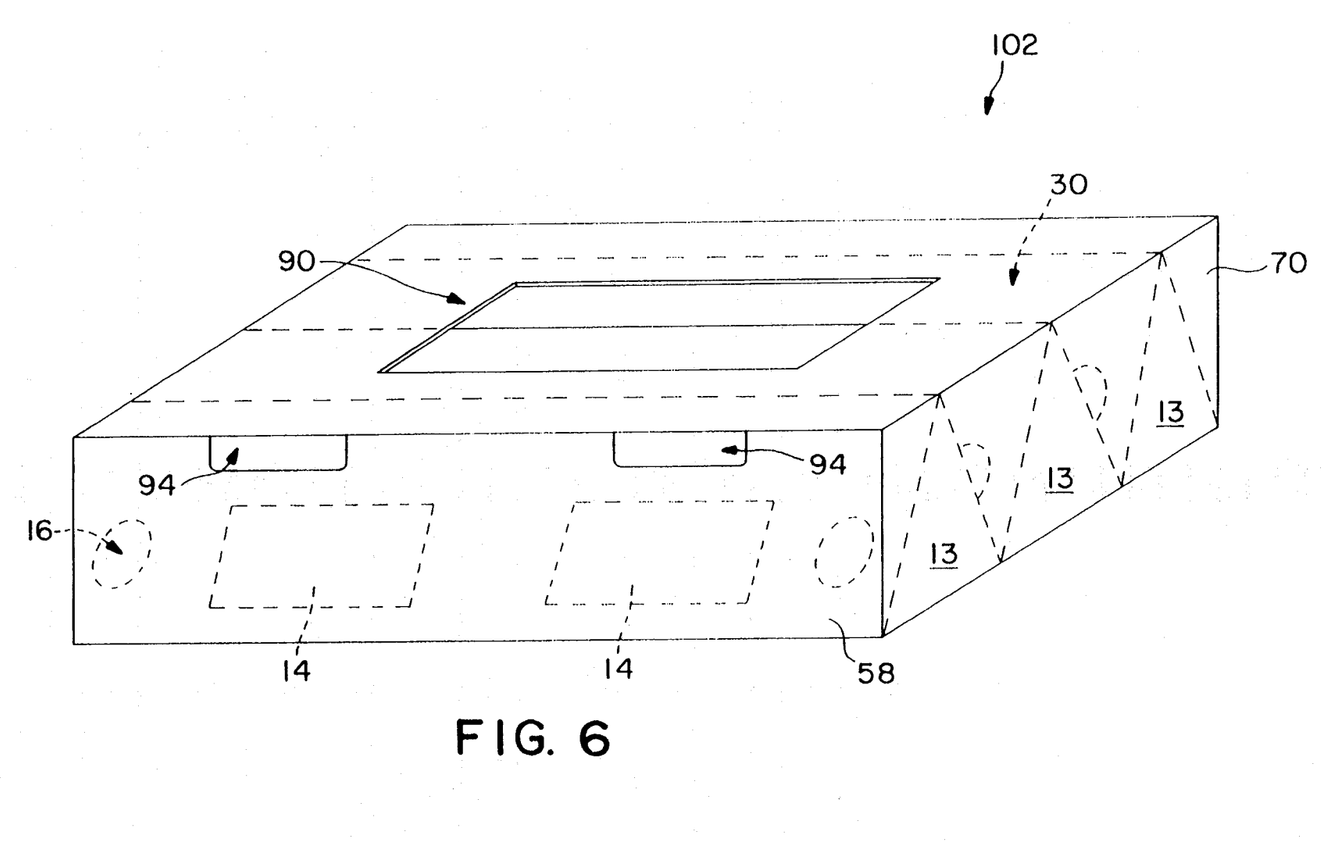
FIG. 6 is an inverted perspective view of a second embodiment of the device of the present invention wherein triangular passageways are provided along an axis which is parallel to the longitudinal axis of the rectangular housing.

In FIG. 6, an inverted perspective view of a second and preferred embodiment of the present invention is illustrated as device 102, which comprises enclosure 40 and folded composite planar sheet 30, whereby triangular passageways are provided along an axis which is parallel to the longitudinal axis of the rectangular housing. Bottom 60 can be provided with a clear plastic covered opening 90. Enclosure 40 is provided with two elongated apertures 94 in front wall 58 and in the opposed back wall to permit insects to pass from the exterior of enclosure 40 to a triangular passageway 13 within device 102. Within enclosure 40 is positioned a folded composite planar sheet 30 which includes a plurality of apertures 14 in the upper sheet member 12 and in lower sheet member 12' (not shown) in each section of the folded composite planar sheet 30. A plurality of openings 16 are provided in upper sheet member 12, lower sheet member 12', and adhesive sheet member 20 which communicate the upper and lower triangular passageways 13.

One or more aperture 14 in upper sheet member 12 and lower sheet member 12' can be offset from one another, and .upper sheet member 12 and lower sheet member 12' can each have one or more, and preferably a plurality of apertures 14.

The materials of construction of enclosure 40 can vary widely and can be paperboard, plastic, metal or the like. Preferably, a paperboard material (e.g., a stiff paperboard) is used which is provided on one side with a water barrier (wax, clay, paint, acrylic, and the like) to resist the passage of moisture into the walls of enclosure 40, thereby prolonging the its service life. More preferably, the paperboard is comprised of from 15 to 100 wt %, most preferably from 40 to 90 wt %, recycled paper, with paperboard comprising at least 50 wt % (e.g., 50-90 wt %) recycled newsprint being most preferred. The balance of the paperboard material can comprise any of the materials conventionally used in the manufacture of paper containing recycled products (e.g, mixed papers, boxboard cuttings, shavings, regular corrugated, double-lined kraft, ledger stocks, computer print outs, printed leached kraft, manifold white ledger, manila tab cards, white envelope cuttings and the like).

The materials of construction used for upper sheet member 12 and lower sheet member 12' can also vary widely, and can be the same or different as the material used in construction of enclosure 40. These sheet members can therefore be constructed of paperboard, plastic, metal or the like. A moisture barrier is not generally required for materials used in constructing sheets 12 and 12'. Preferably, a paperboard material is used. More preferably, the paperboard is comprised of from 15 to 100 wt %, most preferably from 40 to 90 wt %, recycled paper, with paperboard comprising at least 50 wt % (e.g., 50–90 wt %) recycled newsprint being most preferred. The balance of the paperboard material can comprise any of the materials conventionally used in the manufacture of paper containing recycled products (e.g, mixed papers, boxboard cuttings, shavings, regular corrugated, double-lined kraft, ledger stocks, computer print outs, printed leached kraft, manifold white ledger, manila tab cards, white envelope cuttings and the like).

It has been surprisingly observed that insects such as roaches, crickets and the like are attracted to the devices of the present invention, without the need for an artificial (e.g., chemical or biological) attractant or a food attractant (molasses, sugar, and other foodstuffs), and it is believed that paperboard comprised of recycled paper, and particularly recycled newsprint, is itself a strong attractant for household insects.

The manufacture of paperboard containing recycled paper is conventional and does not form a part of the present invention. The manufacture of recycled paper is generally described in "Encyclopedia of Chemical Technology", Vol. 19, pp. 986–992 (3rd Edition, Kirk Othmer).

Composite planar sheet 30 can be made by assembling upper sheet member 12 and lower sheet member 12' together with adhesive sheet member 20 wherein adhesive sheet member 20 is manufactured by removing the protective sheets 21 and 25 (e.g, by manually stripping it away) followed by applying the exposed adhesive surfaces to upper sheet member 12 and lower sheet member 12', thereby causing these members to be securely adhered to opposite sides of adhesive sheet member 20, to form a "sandwich"-like structure. The composite planar sheet 30 so formed can then be folded in a separate operation and inserted into one open end 70 or 80 of enclosure 40 (which is constructed from the blank form in an earlier step, as discussed above in regard to FIG. 1).

The adhesive material used on adhesive sheet member 20 can vary widely, depending on such factors as the types and numbers of insects a given device is intended to contain, the environmental conditions of use of the device, and other factors. Preferably, the adhesive is hydrophobic, and maintains sufficient adhesion to retain an insect thereon for at least 1 month, and more preferably at least 3 months. The adhesive should preferably retain its tackiness over a wide range of temperatures, e.g. from $-70°$ F. to $+350°$ F., more preferably from $-50°$ F. to $+300°$ F., and will resist degradation pr aging when subject to UV light or high concentrations of ozone. Further, the adhesive is preferably free of insect poisons.

Preferred are silicone gel materials such as polydimethyl siloxanes (such as Sylgard 527 primerless silicone dielectric gel) available from Dow Corning), which may be readily synthesized by curing a mixture of A and B components, where A is a mixture of dimethylvinyl terminated polydimethyl siloxane and dimethyl cyclosiloxane, and B is a mixture of dimethylvinyl terminated polydimethyl siloxane and dimethyl cyclosiloxane with methyl hydrogen dimethyl siloxane coploymer. The components can be mixed prior to being applied to the upper or lower surface of film 24. Curing is preferably accomplished after applying the uncured adhesive to the film 24. The adhesive curing conditions will vary depending on the adhesive used, the curing oven used, and a variety of other factors. Preferably, the adhesive is cured for about 10–20 minutes at a temperature of from about 200° F. to 220° F. Gels having various degrees of tacticity may be synthesized simply by varying the weight ratio of A to B. For example, increasing the weight ratio of A:B from 1:1 to 2:1 results in a higher tacticity (greater degree of penetration), that increases the insect holding ability of the adhesive gel. The curing agent for the hydrosilyation reaction can comprise a platinum catalyst. Platinum cured siloxane polymers are disclosed in U.S. Pat. Nos. 4,785,066, 4,122,246, 4,954,597, 5,004,792, 5,153,332, and 5,239,085.

The principles, preferred embodiments, and modes of operation of the present invention have been described in the foregoing specification. The invention which is intended to protected herein, however, is not to be construed as limited to the particular forms disclosed, since these are to be regarded as illustrative rather than restrictive. Variations and changes may be made by those skilled in the an without departing from the spirit of the invention.

We claim:
1. An insect trap which comprises:
   (1) a generally rectangular shaped enclosure provided with a plurality of openings adapted to permit insects to pass therethrough, and
   (2) a folded composite planar sheet positioned within the enclosure to provide a plurality of generally triangular passageways within the enclosure,
   said folded composite planar sheet comprising an upper folded sheet member and a lower folded sheet member between which is provided an adhesive sheet having applied thereto an insect retaining adhesive, said upper and lower sheet members having a plurality of openings therein to permit an insect passing thereon to contact an adhesive surface of said adhesive sheet and said adhesive sheet member and said upper and lower sheet members having a plurality of connecting apertures therethrough to permit insects to pass through said composite planar sheet.

2. The insect trap of claim 1 wherein said triangular passageways are elongated and the longitudinal axis of each is parallel to the longitudinal axis of said rectangular shaped enclosure.

3. The insect trap of claim 1 wherein said triangular passageways are elongated and the longitudinal axis of each of said triangular passageways is transverse to the longitudinal axis of said rectangular shaped enclosure.

4. The insect trap of claim 1 wherein said upper and lower sheet members comprise paperboard containing recycled newsprint.

5. The insect trap of claim 4 wherein the recycled paper content of said paperboard is from about 15 to 100 wt % recycled paper.

6. The insect trap of claim 4 wherein the recycled paper content of said paperboard is from about 40 to 90 wt % recycled paper.

7. The insect trap of claim 4 wherein the recycled paper content of said paperboard is at least about 50 wt % recycled newsprint.

8. The insect trap of claim 1 wherein said adhesive sheet is provided with an insect retaining adhesive to substantially the entire surface of said adhesive sheet.

9. The insect trap of claim 1 wherein said adhesive comprises a siloxane polymer.

10. The insect trap of claims 9 wherein said upper and lower sheet members are constructed from paperboard containing recycled newsprint.

11. The insect trap of claim 10 wherein the recycled paper content of said paperboard is at least about 50 wt % recycled newsprint.

12. The insect trap of claim 11 wherein the recycled paper comprises recycled newsprint.

13. An insect trap which comprises:
   (1) a generally rectangular shaped enclosure provided with a plurality of openings adapted to permit insects to pass therethrough, and
   (2) a folded composite planar sheet positioned within the enclosure to provide a plurality of elongated triangular passageways within the enclosure, said triangular passageways having a longitudinal axis that is parallel to the longitudinal axis of said rectangular shaped enclosure, said folded composite planar sheet comprising an upper sheet member and a lower sheet member between which is provided an adhesive sheet having applied thereto an insect retaining adhesive, said upper and lower sheet members being constructed from paperboard containing recycled paper and said upper and lower sheet members having a plurality of openings therein to permit an insect passing thereon to contact an adhesive surface of said adhesive sheet, and said adhesive sheet member and said upper and lower sheet members having a plurality of connecting apertures therethrough to permit insects to pass through said composite planar sheet.

14. The insect trap of claim 13 wherein the recycled paper content of said paperboard is from about 15 to 100 wt % recycled newsprint.

15. The insect trap of claim 13 wherein the recycled paper content of said paperboard is from about 40 to 90 wt % recycled newsprint.

16. The insect trap of claim 13 wherein the recycled paper content of said paperboard is at least about 50 wt % recycled newsprint.

17. The insect trap of claim 13 wherein said adhesive sheet is provided with an insect retaining adhesive to substantially the entire surface of said adhesive sheet.

18. The insect trap of claim 17 wherein said adhesive comprises a siloxane polymer.

19. The insect trap of claim 18 wherein the recycled paper comprises recycled newsprint.

20. The insect trap of claim 13 wherein said adhesive comprises a siloxane polymer.

* * * * *